United States Patent [19]

Abe et al.

[11] 4,294,806

[45] Oct. 13, 1981

[54] METHOD FOR PREVENTING THE WEAR OF A MONOLITHIC CATALYST BY DUSTS

[75] Inventors: Kazunobu Abe, Izumi; Shoichi Tamura, Sakai; Tadao Nakatsuji, Matsubara, all of Japan

[73] Assignee: Sakai Chemical Industry Co., Ltd., Osaka, Japan

[21] Appl. No.: 96,561

[22] Filed: Nov. 21, 1979

Related U.S. Application Data

[63] Continuation-in-part of Ser. No. 12,196, Feb. 14, 1979, abandoned, which is a continuation-in-part of Ser. No. 974,519, Dec. 29, 1978, abandoned.

[51] Int. Cl.³ ............................................. B01D 53/36
[52] U.S. Cl. .................................... 423/239; 423/210; 423/DIG. 13; 252/461; 252/464; 252/465; 252/466; 252/477 R; 422/170; 422/177; 422/180
[58] Field of Search ............ 423/210, 239, 230, 244 S, 423/215.5, 239 A, DIG. 13; 422/180, 170, 177, 179; 252/477 R, 461, 464, 465, 466

[56] References Cited

U.S. PATENT DOCUMENTS

| | | | |
|---|---|---|---|
| 1,595,711 | 8/1926 | Cornelier | 422/180 |
| 3,983,283 | 9/1976 | Bagley | 422/180 |
| 4,059,544 | 11/1977 | Yamaguchi et al. | 252/477 R |
| 4,102,980 | 7/1978 | Sasaki et al. | 423/239 A |
| 4,131,643 | 12/1978 | Utsuhomiya et al. | 423/239 A |
| 4,134,733 | 1/1979 | Volker et al. | 422/177 |

*Primary Examiner*—Earl C. Thomas
*Attorney, Agent, or Firm*—Wenderoth, Lind & Ponack

[57] ABSTRACT

In a method for treating a gas containing dusts therein under a monolithic catalyst consisting of a ceramic support which is substantially porous throughout the structure, and has active ingredients uniformly dispersed therein and passages therethrough parallel to the flow of the gas for allowing the gas to pass therethrough, the improvement in which the catalyst has the sintered front portion or has a vitreous coating on the front portion. Alternatively, the improvement in which a metal or sintered ceramic lid having openings therethrough is fixed onto the front face of the catalyst with the passages in alignment with the openings of the lid.

12 Claims, 8 Drawing Figures

METHOD FOR PREVENTING THE WEAR OF A MONOLITHIC CATALYST BY DUSTS

The present application is a continuation-in-part of application Ser. No. 12,196, filed Feb. 14, 1979, and now abandoned, which is a continuation-in-part of application Ser. No. 974,519, filed Dec. 19, 1978, and now abandoned.

The present invention relates to a method for preventing the wear of a ceramic porous monolithic catalyst, particularly, the front portion thereof, by dusts in gases when the gases are allowed to pass through passages of the catalyst parallel to the flow of the gases.

In general, a monolithic catalyst has one or more passages therethrough for allowing gases to pass therethrough. When incorporated into a reactor, usually a plurality of the catalysts are held side by side and/or laid one on the other in a basket or frame, and then charged into the reactor so that the passages are parallel to the flow of the gases, thus forming a fixed bed catalyst. This parallel arrangement of the passages to the flow of gases does not suffer from a large pressure loss during the passage of the gases through the passages. Therefore, the arrangement is suitably used for treating a large amount of gases at high linear velocity. A further advantage of the arrangement is that it prevents the choking of the passages by dusts.

Because of the above advantages, a monolithic catalyst has been in a wide use, for example, for removing nitrogen oxides, typically, nitrogen monoxide and dioxide, contained in waste gases exhausted from boilers, internal combustion engines, etc., for deodorizing waste organic gases, and for other purposes.

A conventional ceramic monolithic catalyst consists of a ceramic support and catalytically active ingredients coated thereon. In more particular, the ceramic support is prepared by sintering a mold of clay at high temperature, usually about 1000° C. or higher. Thus, the ceramic support obtained has a small pore volume, usually smaller than 0.1 cc/g, and a small specific surface area. The latter, however, depends upon a ceramic material used, and a sintered titanium dioxide support usually has a specific surface area not larger than about 5 m$^2$/g, and a sintered alumina support, usually not larger than about 20 m$^2$/g. That is, the support used in the conventional ceramic monolithic catalyst is substantially non-porous or solid. The support is then immersed in a slurry of active ingredients or their precursors, dried, and calcined to have a coating of the active ingredients thereon.

Therefore, in the conventional ceramic monolithic catalyst, the support has a sufficiently large mechanical strength inclusive of wear-resistance due to its non-porous structure. However, the catalyst has usually a low catalytic activity since it is difficult to form a thick coating on the surface of the support because of poor affinity of the sintered ceramic support for the coating thus formed as well as of a small pore volume of the support.

For the purpose of obviating the above disadvantage involved in the prior catalyst as is described above, the inventors have developed a ceramic porous monolithic catalyst which itself is substantially porous throughout the structure, and thus has a larger pore volume and a larger specific surface area, and further has active ingredients uniformly dispersed therein. Usually, the catalyst has a pore volume of about 0.2–0.6 cc/g, preferably about 0.3–0.5 cc/g. The specific surface area of the catalyst is, for example, about 10–150 m$^2$/g when titanium dioxide is used as a porous support, and about 50–400 m$^2$/g when alumina is used.

The catalyst is prepared, for example, by extruding a slurried or wet mixture of a ceramic material for forming a support and active ingredients or their precursors directly into a tubular or honeycomb structure, and then drying the obtained structure, and if necessary calcining at low temperature at which the sintering neither of the ceramic material nor of the active ingredients occurs, thereby keeping the obtained catalyst substantially porous throughout the structure. The thus obtained catalyst, when desired, may further carry additional active ingredients uniformly dispersed therein by immersing the catalyst in a solution of the active ingredients or their precursors, drying, and then if necessary calcining.

The catalyst may also be prepared by coprecipitating a ceramic material for a support and active ingredients or their precursors, and then by extruding the wet coprecipitates into a tubular or honeycomb structure, which is then dried and calcined in the same manner as above. The catalyst may also be prepared by at first preparing a porous support and then immersing the support in a solution of active ingredients or their precursors, drying the thus obtained product, and if necessary calcining.

The catalyst of the inventors' is, as is described above, substantially porous throughout the structure, and has active ingredients uniformly dispersed in the porous structure, hence herein the specification, that a catalyst has active ingredients support thereon means that the catalyst has the active ingredients uniformly dispersed in a porous support.

The catalyst has a higher catalytic activity than the prior ceramic catalyst since it is porous throughout the structure, and thus has a larger specific surface area which will retain a much larger amount of active ingredients. However, the catalyst is less wear-resistant than the prior ceramic catalyst due to its porosity, and is encountered with difficulty when applied to the treatment of gases containing dusts therein, especially hard dusts. The dusts collide with the surface of the catalyst, in particular, the front face thereof, at high velocity, thereby to wear away or "corrode" the surface of the catalyst together with the active ingredients supported thereon. This results in the decrease in the catalytic efficiency. The powders and fragments of the catalyst thus corroded therefrom further may cause a secondary air pollution and also may choke the passages of the catalyst.

As is previously stated, a ceramic monolithic catalyst is advantageously used for reducing nitrogen oxides contained in heavy oil or coal combustion waste gases, and these waste gases contain a large amount of dusts therein. It has been found out that, upon treating these waste gases, the wear of the catalyst occurs at first mainly at the front portion of the catalyst, and then spreads towards the opposite or rear portion. Thus, it is very important to prevent the wear of the front portion of the catalyst.

One of the conventional methods for treating gases containing dusts therein is, as is well known, to remove the dusts by a dust collector prior to the introduction of the gases into a reactor. However, a wet dust collector lowers the temperature of the gases, and the gases discharged therefrom is usually at a temperature of about 50° C. Thus, if the gases should be introduced into the reactor at higher temperatures, it is necessary to heat the gases in advance. This needs an additional heating unit and heat energy, resulting in a higher treating cost. This is just the case with the catalytic reduction of nitrogen oxides in waste combustion gases, since the gases must be passed through the reactor usually at temperatures of about 200°–500° C. Dry dust collecting is also an effective method for removing dusts in gases. In particular, an electric precipitator is preferably used when a high efficiency of dust removal is required. However, the electric precipitator is very expensive, and moreover, the gases should be supplied to the precipitator at temperatures below about 200° C. Thus, this method is also uneconomical.

An object of the present invention is, therefore, to provide a method for preventing the wear of a ceramic porous monolithic catalyst, especially the front portion thereof, by dusts on treating gases containing dusts therein under the catalyst having one or more passages therethrough for allowing the passage of the gases therethrough.

Other objects and features of the invention will be apparent from the following description and the drawings attached hereto wherein the like reference characters designate corresponding parts or portions in the several views, and wherein.

Figure 1:
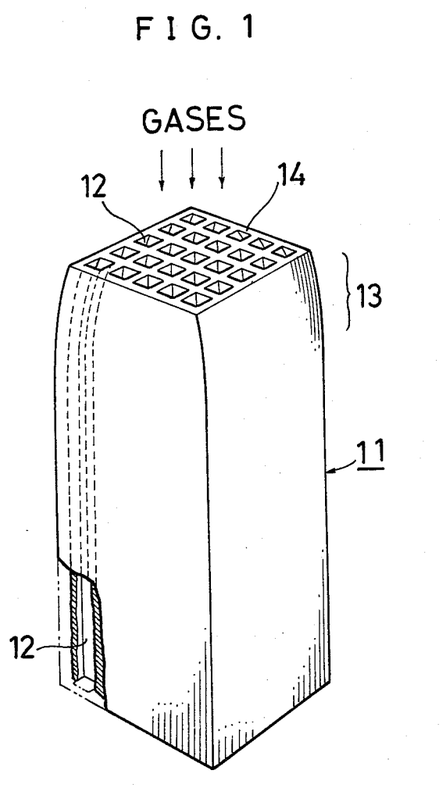
FIG. 1 is a partially cut-away perspective view of an embodiment of a ceramic porous monolithic catalyst having the sintered front portion according to the invention.

Referring first to FIG. 1, there is shown a ceramic porous monolithic catalyst generally designated by a reference number 11 which is used in the method of the invention. The catalyst consists of a ceramic porous support and active ingredients supported thereon, and has at least one passage 12 extending longitudinally throughout the catalyst, and the sintered front portion 13. The sintered front portion has a contracted volume due to the sintering, as is shown rather exaggerately, and is substantially non-porous, contrary to the remaining porous portion.

The catalyst is, as is previously mentioned, disposed or held in a reactor so that the passages are parallel to the direction of flow of a gas to be treated, and now herein the specification, the front portion means a portion inclusive of the front face 14 of the catalyst on the side of the inlet of the reactor at which the gas enters.

The catalyst having the sintered front portion is produced either by sintering the front portion of a porous support and then supporting active ingredients on the support, or by supporting at first active ingredients on the support and then sintering the front portion of the thus obtained product.

Further herein the specification, sintering means to heat a ceramic material at high temperatures to make the material substantially non-porous, whereas calcining means to heat a ceramic material at such low temperatures at which the material still remains porous.

The sintering temperature at which the front portion of a ceramic porous support is sintered depends upon a ceramic material used for the support. For example, when consisting of titanium dioxide, the support is sintered preferably at about 750° C., and when consisting of alumina, at about 1000° C. After the sintering, active ingredients are supported on the support thus having the sintered front portion. Usually, precursors for active ingredients are supported on a support, which is then calcined to convert the precursors into active form. For example, a titanium dioxide porous support, after sintering the front portion thereof, is immersed in an aqueous solution of ammonia paratungstate and ammonium metavanadate, dried, and then calcined at temperatures of about 350°–450° C. to convert the ammonium salts into active tungsten trioxide and vanadium pentoxide, respectively. The resultant monolithic catalyst is very effective for the catalytic reduction of nitrogen oxides into nitrogen and water in the presence of ammonia as a reducing agent.

In turn, a ceramic porous support has active ingredients supported thereon, and then the thus obtained product may be sintered at the front portion thereof. In this case, the front portion is heated to a temperature at which either the support or the active ingredients, or both, are sintered. Although the active ingredients may lose their activity during the sintering depending on the sintering temperature, the obtained catalyst still has a sufficiently high catalytic activity since the sintered portion is limited to the front portion and the remaining portion is porous and active. For example, when a catalyst has cupric oxide (CuO), nickel monoxide (NiO), cobalt monoxide (CoO), vanadium pentoxide ($V_2O_5$), tungsten trioxide ($WO_3$), and titanium dioxide ($TiO_2$) supported thereon as active ingredients, the catalysts are heated at their front portions at temperatures of about 500° C., 800° C., 800° C., 450° C., 500° C., and 750° C., respectively, to sinter the active ingredients.

The sintering of a support or a catalyst is preferably carried out in the presence of sintering promotors, among which are, for example, boric acid, borates such as sodium borate and lead borate, chlorides such as lead dichloride, zinc chloride, cupric chloride and bismuth chloride, and oxides such as vanadium pentoxide, dipotassium trioxide and sodium oxide. The sintering promotor serves to lower the sintering temperature. For example, a titanium dioxide support containing 0.1–5 weight % of boric acid begins to sinter at about 600° C., and an alumina support containing 0.1–5 weight % of zinc chloride begins to sinter at about 800° C.

The sintering promotor is usually applied to a porous support or a porous catalyst in the form of aqueous solution or slurry. For example, a titanium dioxide support is immersed in a 100 g/l-aqueous solution of boric acid at the front portion thereof, and then the portion is heated to a temperature of about 650° C. for sintering. Therefore, the use of promotor has an advantage, for example, when a support has precursors supported thereon and has the promotor at its front portion only immersed is heated, in that the front portion only is sintered whereas the remaining portion is calcined and thus remains porous.

In sintering, when heated rapidly, a catalyst or a support will be easy to break during or after the sintering due to the stress generated during the sintering. Therefore, on sintering a catalyst or a support is slowly heated. For example, when a support mainly comprises titanium dioxide, the support is preferably heated at a rate of 200° C./hr. or less, with a temperature slope of about 50° C./cm. or less from the front face towards the rear face.

Figure 2:
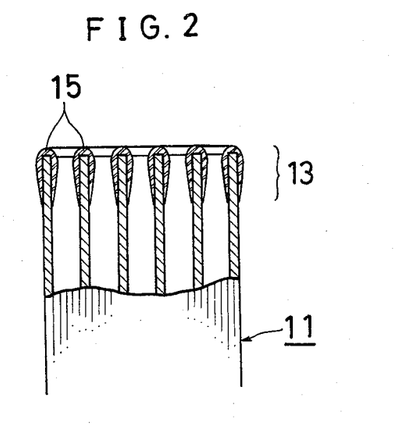
FIG. 2 is a longitudinal sectional view in part of another embodiment of a catalyst having a vitreous coating on the front portion according to the invention.

A further method for producing a ceramic porous monolithic catalyst having the wear-resistant front portion is, as is shown in FIG. 2, to form a vitreous coating 15 on the front portion 13 of the catalyst 11.

The most preferred material for the vitreous coating is glaze inclusive of low melting point glass and low temperature glass. A precursor for glaze may be prepared in any conventional manner, and the thus prepared glaze precursor is usually applied to the front portion of catalyst or a support in the form of a slurry. For example, raw materials or frit for glaze, or low melting point glass or low temperature glass, or a mixture of these, is wet-milled together with a dispersant such as carboxymethyl cellulose, and other additives such as bentonite, using a ball mill, thus providing a glaze slurry. The milled product comprises, for example 12.3 weight % of particles of 8.3–2.5 microns, and the residue smaller than 2.5 microns.

A glaze precursor can be applied at various stages in manufacturing a ceramic porous monolithic catalyst used in the invention. For example, a slurry of glaze precursor is applied to a precursor of a support, which is then calcined to provide a porous support with a simultaneous formation of a glaze coating at the front portion thereof. Alternatively, the slurry may be applied either to a calcined support, a precursor of catalyst having precursors of active ingredients thereon, or a catalyst having active ingredients thereon. As an example, a precursor for a support is calcined, precursors of active ingredients are applied thereto and calcined to provide a catalyst, and the thus obtained catalyst is immersed in a slurry of glaze precursor, dried, and calcined, thus to provide a catalyst having on its front portion a glaze coating. If desired, the immersion is repeated.

A glaze precursor used is usually selected in consideration of temperatures at which precursors of active ingredients are calcined on a support, or at which a support is calcined, depending on the stage where the glaze precursor is applied, and the temperature at which the resultant catalyst with a glaze coating on the front portion is used, and further the difference in the thermal expansion coefficients between the support and the glaze coating. As is apparent, a glaze precursor must melt at the above mentioned calcining temperature, but must not melt at the temperature at which the resultant catalyst is used. In general, when a resultant catalyst is used at about 400° C. or below, a glaze mainly comprising lead borate and borax are preferably used, and when used at about 400°–1000° C., low melting point glass, low temperature glass and low-fired glaze are preferably used.

When a glaze coating is to be formed simultaneously when precursors of active ingredients on a support are calcined, low temperature glass and low melting point glass are preferably used, since the precursors are usually calcined at temperatures of about 300°–800° C. An example of low melting point glass has a glaze formula of 0.50 $Na_2O$
0.50 PbO
2.00 $SiO_2$
1.00 $B_2O_3$ and melts at temperature of about 600° C. A second example has a glaze formula of 1.00 PbO
0.35 $SiO_2$
0.41 $B_2O_3$ and melts at temperature of about 450° C.

A typical low temperature glass has a glaze formula of 1.00 $Na_2O$
1.00 CaO
0.32 MgO
0.79 $Al_2O_3$
4.79 $SiO_2$
2.00 $B_2O_3$ and melts at temperature of about 790° C. A second one has a glaze formula of 0.50 $Na_2O$
0.25 CaO
0.25 MgO
0.02 $Al_2O_3$
1.00 $B_2O_3$
1.04 $SiO_2$ and melts at temperature of about 690° C.

On the other hand, when a glaze coating is to be formed when a precursor of support is calcined, a glaze used may be low-fired glaze depending upon the calcining temperature in addition to the low temperature glass and low melting glass, since the calcining temperature is usually ranges from about 300° C. to about 1000° C. An example of low-fired glaze has a glaze formula of 0.80 PbO
0.10 $K_2O$
0.10 CaO
0.17 $Al_2O_3$
1.00 $SiO_2$ and melts at temperature of about 900° C.

Now in more particular, since a support mainly comprising alumina and/or titanium dioxide has a thermal expansion coefficient of about $80 \times 10^{-7}$/°C., a low melting point glass having, for example, a glaze formula of 1.00 PbO
0.40 $B_2O_3$
0.54 $SiO_2$ and melting at 454° C., a low temperature glass having, for example, a formula of 0.36 PbO
0.52 $Na_2O$
0.12 CdO
0.48 NaF
0.04 $Al_2O_3$
0.24 $B_2O_3$
3.68 $SiO_2$ and melting at temperature of 680° C., etc. are preferably used. These have a expansion coefficient of about $40 \times 10^7$/°C.

When a glaze contains PbO and $SiO_2$ as ingredients and is required to have acid-resistance, a small amount of alumina may be added thereto.

Another material for forming the vitreous coating is an inorganic binder. Some preferable examples are alkali silicate binders such as lithium silicate and sodium silicate also known as water glass, a silica sol binder (silicic acid colloid solution), an alumina sol binder (alumina colloid solution), an aluminum phosphate binder in the form of aqueous solution, slurry or paste.

Lithium silicate with the $SiO_2/Li_2O$ mole ratio of 1/3.5-7 is chemically stable, and has an excellent water resistance. The lithium silicate of a relatively small $SiO_2/Li_2O$ mole ratio, for example, smaller than 1/5, is preferably used since such silicate has a better wear-resistance as well as water-resistance. Water glass is stable in the $SiO_2/Na_2O$ mole ratio of 2-4/1, but less water-resistant than lithium silicate. Thus, water glass is used preferably together with about 10 weight % of zinc powder so as to improve the water-resistance.

The silica sol binder is a very fine anhydrous silicic acid colloid solution containing about 30 weight % or less of silicon oxide. The binder of a large silicon oxide content is preferably used to obtain a dense and wear-resistant coating. Similarly, the alumina sol binder is a very fine alumina colloid solution and contains about 20weight % or less of alumina. From the same reason as above, the binder of a large alumina content is preferably used.

The aluminum phosphate herein means aluminum primary phosphate and sesquiphosphate, both water soluble, and aluminum secondary phosphate which is slightly soluble in water, excluding aluminum tertiary phosphate which will not form a solid vitreous coating on heating. The primary and/or sesquiphosphate are used as an aqueous solution binder preferably containing about 50 weight % of the phosphate. Aluminum secondary phosphate is usually used in the form of slurry which contains preferably about 50 weight % of the phosphate.

Figure 3:
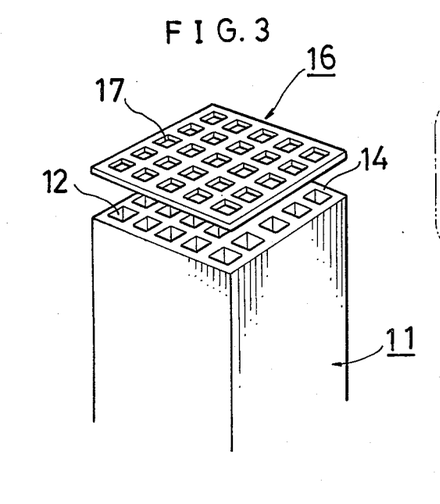
FIG. 3 is a perspective view of an embodiment of a metal lid for preventing the wear of the front portion of a ceramic porous catalyst according to the method of the invention.

According to the present invention, a further method for preventing the wear of the front portion of a ceramic porous monolithic catalyst is provided. As is shown in FIG. 3, the method uses a lid 16 which is put or fixed on the front face 14 of the catalyst 11 in contact therewith. The lid has at least one opening 17 therethrough and is so put or fixed on the front face of the catalyst that the openings are in alignment with the passages 12 of the catalyst.

Figure 4:
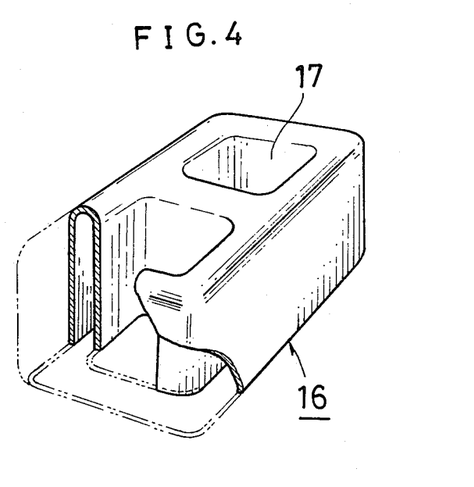
FIG. 4 is a partially cut-away perspective view of another embodiment of a lid used in the invention.
Figure 5:
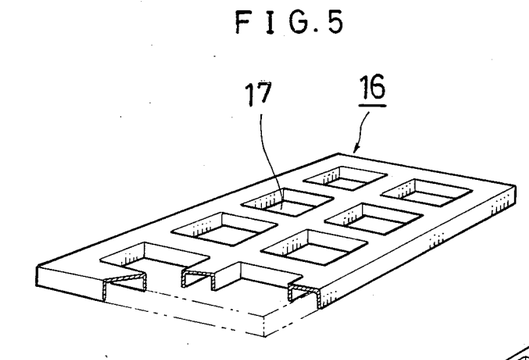
FIG. 5 is also a partially cut-away perspective view of a further embodiment of a metal lid.

The lid is preferably made of metal or sintered ceramic material. The lid may be produced by any conventional method for producing a similar product. For example, a metal lid is manufactured by press work inclusive of shearing, bending and deep drawing processes. These processes are conventional ones, hence detailed explanation will be omitted here. The lid 16 as is shown in FIG. 3 may be manufactured by punching a metal sheet. A lid 16 of FIG. 4 is manufactured by deep drawing so as to have openings 17. A lid 16 as is shown in FIG. 5 may be manufactured by bending a metal sheet having punched openings 17.

The metal for the lid is selected in consideration of atmosphere and temperature where a gas to be treated is passed through and metal works involved. For example, when a gas is introduced into a reactor at temperatures below about 600° C., plain steel, austenite steel such as 18-8 steel, special purpose steel such as Stainless 10 and Hastelloys are used. When a gas is treated at temperatures of about 600°-800° C., a lid is preferably made of ferritic steel such as JIS SUS 38 and 24 steels. When a gas is introduced into a reactor at higher temperatures than about 800° C., for example, about 800°-1000° C., then heat-resistant steel such as 28Cr steel and 25-12 steel are preferably used.

When the atmosphere is acidic, for example, when a gas contains sulfur dioxide, a lid is preferably made of ferritic steel such as JIS SUS 38 and 24 steels, special purpose steel such as Stainless 10, 20 Alloy, Ni-O-nel, Illium, and Hastelloys.

Figure 6:
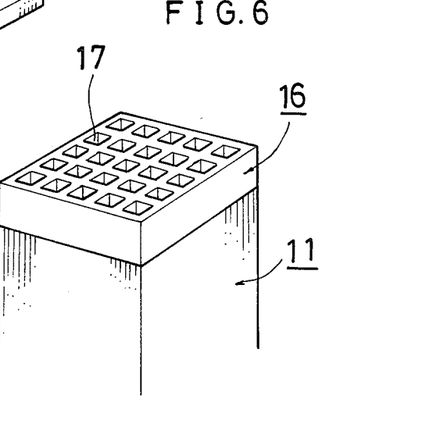
FIG. 6 is a perspective view of a ceramic lid put on the front face of a ceramic porous catalyst.

A lid may also be manufactured by injection, extrusion, casting and powder molding of ceramic material. As is shown in FIG. 6, a ceramic mold is so formed as to have one or more openings 17 correspondingly to the number of the passages of a catalyst 11 on which the lid is fixed, dried, calcined preliminarily at temperatures of about 300°-800° C., and then sintered at higher temperatures to a lid 16, depending upon a ceramic material used.

Ceramic materials usually used for manufacturing a lid are pottery stone, feldspar, silica, kaoline, clay such as Kibushi clay and Gairome clay, alumina, titanium dioxide, zirconium oxide, magnesium oxide, and mixtures of these. When a ceramic lid must be acid-resistant, silica, zirconium oxide, titanium dioxide and mullite are preferably used. Most preferably, an equimolar mixture of anatase titanium dioxide and alpha alumina is used. The mixture is molded into a lid precursor, dried, calcined at temperatures of about 900° C., and then sintered at temperatures of about 1300° C.

When calcined and sintered, a ceramic mold decreases its volume by about 5-40% of the original. However, the rate of contraction of volume upon heating is fixed for a material used and the conditions under which the mold is heated. Thus, a lid of predetermined size can be obtained by choosing appropriately a material and conditions.

A lid is preferably formed so as to have the same cross sectional area and the same number of openings of the same size as those of a monolithic catalyst on which the lid is put or fixed, so that all the openings of the lid are in alignment with all the passages of the catalyst. As is previously mentioned, a mold can be sintered at lower temperatures by the use of a sintering promotor. For example, boric acid and zinc chloride may be used as a promotor for titanium dioxide and alumina, respectively. If necessary, a mold may have a vitreous coating thereon as formed in the same manner as is previously described.

Now the arrangement of the catalyst in a reactor will be described as a further aspect of the present invention.

In actual use of the catalysts of the invention, usually a plurality of catalysts are disposed one on the other coaxially with the passages thereof in alignment, and/or side by side, held by a basket or frame (not shown) to form a catalyst assembly. When the assembly includes the catalysts disposed one on the other, there is provided an arrangement of catalysts according to the invention, in which at least the foremost catalyst on the side of the inlet of a reactor has the wear-resistant front portion, as is previously described. That is, at least the foremost catalyst must have either the front portion sintered, the vitreous coating on the front portion, or the lid put or fixed on the front face of the catalyst.

Figure 7:
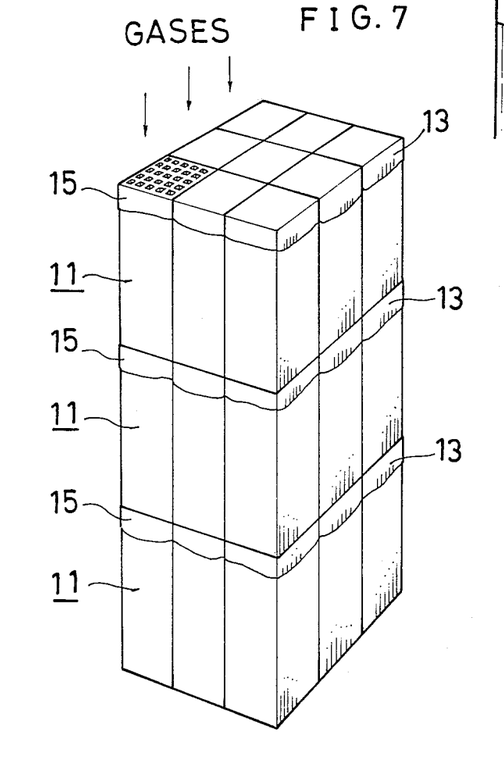
FIG. 7 is a perspective view illustrating an embodiment of arrangement of the catalysts of the invention.
Figure 8:
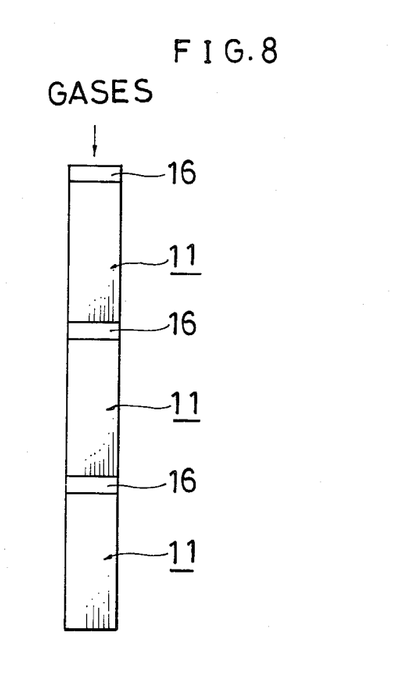
FIG. 8 is a front view also illustrating an arrangement of catalysts according to the invention.

However, it may be practically difficult to align all the passages of one catalysts with all the passages of the adjacent catalyst at the mating surface therebetween. Then, around the mating surface there may be generated a turbulent flow of gas, and dusts in the gas may corrode the front portion of the adjacent catalyst. Therefore, according to a preferable arrangement of catalysts of the invention, all the catalysts may have the wear-resistant front portions. As an example, FIG. 7 shows a catalyst assembly which comprises a plurality of catalysts 11 disposed one on the other, and each catalyst has the vitreous coating 15 on the front portion 13 thereof. In stead of the vitreous coating, each catalyst may have the front portion sintered, although not shown. FIG. 8 shows a further embodiment of the arrangement of catalysts according to the invention, in which each catalyst 11 has a lid 16 fixed on the front face thereof. As will be readily inderstood, any combination of the above arrangements may be employed. For example, the foremost catalyst has the sintered front portion, the second catalyst has the vitreous coating on the front portion, and the third catalyst has the lid fixed on the front face thereof, and so on.

According to the invention, as is fully set forth hereinbefore, the ceramic porous monolithic catalyst has either the sintered front portion, the vitreous coating on the front portion, or the wear-resistant lid fixed on the front face thereof, and therefore the catalyst is prevented from the wearing at the front portion by dusts contained in gases to be treated, thereby keeping the catalytic activity high over a long period of time.

Furthermore, the catalyst used in the invention is substantially porous throughout the structure except the sintered or coated front portion, and thus has a higher catalytic activity than the prior ceramic catalyst consisting a sintered support and active ingredients coated thereon.

To further illustrate the invention, and not by way of limitation, the following examples are given, in which parts designate parts by weight unless otherwise stated.

EXAMPLE 1

A uniform mixture of 2 parts of ammonium metavanadate, 8 parts of ammonium paratungstate, 100 parts of anatase titanium dioxide, 15 parts of Kibushi clay, 20 parts of ethylene glycol, 2 parts of polyethylene oxide, and 50 parts of water was extruded from a die into pellets. The pellets were in turn extruded from a die into a honeycomb structure having passages therethrough of square section. The honeycomb was dried at temperature of about 100° C. for 10 hours, heated to 350° C. at a rate of 100° C./hr., and then maintained at the temperature for 3 hours for calcination, thus providing a rigid, porous monolithic catalyst of 150 mm.×150 mm. in section and 500 mm. in length, having the passages each 7 mm.×7 mm. in section and each separated by a wall 1.5 mm. thick, extending longitudinally throughout the catalyst.

A mixture of 78.8 parts of minium, 9.6 parts of borax, and 11.6 parts of silica and was calcined at temperature of about 510° C. to melt the mixture, cooled rapidly with water, and then milled using a ball mill, thus providing a frit having the formula of
1.00 PbO
0.40 $B_2O_3$
0.54 $SiO_2$.

Ninety parts of this frit were mixed with 10 parts of low expansion glass frit consisting of 45 weight % of silica sand, 45 weight % of borax and 10 weight % of sodium oxide, that is, having the glaze formula of:
1.00 $Na_2O$
0.88 $B_2O_3$
4.69 $SiO_2$, 0.1 parts of carboxymethyl cellulose, and 80 parts of water, and then again milled thoroughly, thus providing a slurry of glaze.

The front portion of about 30 mm. long of the above porous monolithic catalyst was immersed in the above glaze slurry for a few seconds, dried at 100° C., heated to 510° C. at a rate of 100° C./hr., and then maintained at the temperature for another one hour. The thus calcined catalyst are then cooled slowly at a rate of 10° C./hr., thus providing a ceramic porous monolithic catalyst which has vanadium pentoxide and tungsten trioxide as active ingredients supported thereon, and also the vitreous coating of glaze on the front portion.

The catalyst is particularly effective for reducing nitrogen oxides in waste gases from boilers, internal combustion engines, etc.

EXAMPLE 2

A uniform mixture of 100 parts of alpha alumina, 15 parts of Kibushi clay, 18 parts of ethylene glycol, 1.8 parts of polyethylene oxide, and 50 parts of water was extruded into a honeycomb structure, dried, and calcined in the same manner as in Example 1.

A mixture of 20 parts of litharge, 55 parts of silica sand, 4 parts of borax, 13 parts of calcined soda, 10 parts of cadmiun oxide, 10 parts of sodium silicofluoride, and 4 parts of alumina was molten at temperature of 840° C., cooled rapidly with water, and then milled by a ball mill. One hundred parts of the resulting frit were mixed with 0.1 parts of carboxymethyl cellulose and 80 parts of water, and then milled thoroughly using a ball mill, thus providing a slurry of glaze, which has the following glaze formula:
0.31 PbO
0.41 $Na_2O$
0.10 CdO
0.18 NaF
1.97 $B_2O_3$
0.14 $Al_2O_3$
0.10 $SiF_4$
3.17 $SiO_2$.

In this glaze slurry was immersed the abovementioned porous support at the front portion in the same manner as in EXAMPLE 1, dried, calcined, and cooled in the same manner as in EXAMPLE 1, except that the calcining temperature was 843° C., thus to provide a porous support having the glaze coating on the front portion.

Active ingredients are supported on the support, thus to provide a ceramic porous monolithic catalyst having the wear-resistant front portion.

EXAMPLE 3

A uniform mixture of 100 parts of anatase titanium dioxide, 15 parts of Kibushi clay, 18 parts of ethylene glycol, 1.8 parts of polyethylene oxide, and 50 parts of water was extruded into pellets. The pellets were then extruded into a honeycomb structure of the same size and configuration as those of the catalyst in EXAMPLE 1. The honeycomb was then heated to temperature of 350° C. at a rate of 100° C./hr., and then maintained at the temperature for 3 for a preliminary calcination. Then, the front portion of 30 mm. long from the front face of the honeycomb was immersed in a 100 g/l-aqueous boric acid solution so that the amount of boric acid supported on the honeycomb support was almost zero at a portion about 50 mm. apart from the front face, and increased towards the front face at a rate of about 0.9 weight %/cm. The support was then further heated to temperature of 650° C. at a rate of 20° C./hr., and maintained at the temperature for one hour for sintering at the front portion only containing boric acid as a sintering promotor.

The thus obtained support having the sintered front portion was immersed in a methyl amine solution containing vanadium salts (50 g/l as $V_2O_5$), dried, heated to temperature of 450°0 C. at a rate of 100° C./hr., and maintained at the temperature for 3 hours, thus providing a ceramic porous monolithic catalyst which had vanadium pentoxide as active ingredients supported thereon. The thus obtained catalyst is very effective for reducing nitrogen oxides in waste gases.

The above porous support was alternatively immersed in an aqueous solution of ammonium paratungstate (100 g/l was $WO_3$) for 10 minutes, dried at 100° C. for 12 hours, heated to temperature of 450° C., and maintained at the temperature for 3 hours, thus providing a porous catalyst comprising a porous titanium dioxide support and tungsten trioxide supported thereon as active ingredients. The thus obtained catalyst is also effective for the reduction of nitrogen oxides.

EXAMPLE 4

Using the same ceramic composition including ammonium metavanadate, ammonium paratungstate, anatase titanium dioxide, Kibushi clay, ethylene glycol, polyethylene oxide and water, and in the same manner as in EXAMPLE 1, a ceramic porous monolithic catalyst of the same size and configuration as those of EXAMPLE 1 was prepared.

The front portion about 30 mm. long from the front face of the catalyst was immersed in a 20 weight % aqueous solution of lithium silicate with the $SiO_2/Li_2O$ mole ratio for 7/1 for 3 minutes, dried, and heated at temperature of 120° C. for 3 hours, thus providing a ceramic porous monolithic catalyst having the vitreous coating on the front portion.

EXAMPLE 5

An 18-8 stainless steel sheet 150 mm.×150 mm.×3 mm. in size was punched by the use of an automatic punching machine, so that the sheet had openings each 7 mm.×7 mm. in cross section at intervals of 1.5 mm., as is shown in FIG. 3. The thus obtained lis is, for example, fixed on the front face of a ceramic porous monolithic catalyst 150 mm.×150 mm. in cross section, thereby preventing the wear of the front portion by dusts.

EXAMPLE 6

A JIS SUS 38 ferritic stainless steel sheet was deep drawn by means of a double action press into a lid, as is shown in FIG. 4.

EXAMPLE 7

A stainless 10 thin sheet, which is not suitable for deep drawing process, was punched at first so as to have openings of the same size and shape as those of ceramic porous monolithic catalyst used in combination therewith, and then bent along grooves formed thereon in advance into a metal lid, as is shown in FIG. 5.

EXAMPLE 8

A uniform mixture of 80 parts of a mullite, 14 parts of polystyrene, 2 parts of diallylphthalate, and 4 parts of stearic acid was extruded from a die into pellets. The pellets were then extruded from a die into a block having openings therethrough, heated to temperature of 350° C. at a rate of 6° C./hr., and maintained at the temperature for 3 hours to decompose the organic substances contained therein. The block was further heated to temperature of about 1200° C. at a rate of 100° C./hr., and maintained thereat for 3 hours, thus providing a ceramic sintered lid, as is shown in FIG. 6.

EXAMPLE 9

A uniform mixture of 32 parts of kaoline, 9 parts of Gairome clay, 23 parts of quartz, and 63 parts of feldspar was cast into a square block mold having openings therethrough, heated to about 800° C. at a rate of 100° C./hr., and calcined at the temperature for one hour. The block was then further heated to temperature of about 1300° C. at a rate of 200° C./hr., and was sintered at the temperature for one hour, thus providing a sintered ceramic lid.

EXAMPLE 10

A uniform mixture of 100 parts of Kibushi clay, 18 parts of polyethylene oxide, 1.8 parts of ethylene glycol, and 45 parts of water was extruded from a die into a honeycomb structure, heated to temperature of 350° C. at a rate of 10° C./hr., and then further heated to temperature of about 1200° C. at a rate of 100° C./hr., and heated at the temperature for another one hour, thereby providing a ceramic sintered lid.

REFERENCE EXAMPLE 1

The same ceramic pellets as used in EXAMPLE 1 were extruded into a honeycomb structure. The structure was dried at temperature of 100° C. for 10 hours, heated to temperature of 450° C. at a rate of 100° C./hr., and maintained at the temperature for 3 hours, thus providing a ceramic porous monolithic catalyst of the same size and configuration as those of the catalyst in EXAMPLE 1 except that the thus obtained catalyst had no vetreous coating on the front portion.

EXAMPLE 11

The sixteen catalysts having the vitreous coating on the front portions obtained in EXAMPLE 1 were fixed together side by side with ceramic paper therebetween so as to form a layer of catalysts in a basket 600 mm.×600 mm. in section and 500 mm. in length. The four baskets incorporating therein the catalysts were prepared, and fixed in a reactor side by side so that the front faces on the 96 catalysts were all on one plane. The thus obtained catalyst assembly will be called "A" assembly.

The metal lid of EXAMPLE 5 was fixed on the front face of the catalyst of REFERENCE EXAMPLE 1 with the openings thereof in alignment with the passages of the catalyst. Sixteen catalysts were prepared in this manner, and fixed in a basket in the same manner as above. The four baskets were thus prepared, and fixed in a reactor in the same manner as above. This assembly will be called "B" assembly.

In the same manner as in the assembly "A", 96 catalysts of EXAMPLE 3 having tungsten trioxide as active ingredients supported on the porous titanium dioxide support were fixed in a reactor, thus providing "C" assembly.

Similarly, 96 catalysts obtained in EXAMPLE 4 provided "D" assembly.

A reference assembly "R" was prepared in the same manner as above using 96 catalysts of REFERENCE EXAMPLE 1. Thus, the catalysts of this assembly had neither the wear-resistant front portion nor the lid fixed thereonto.

A coal combustion boiler waste gas containing 500-800 ppm of nitrogen oxides, mainly nitrogen monoxide and dioxide, 1-3 volume % of oxygen, 9-12 volume % of carbon monoxide, 15-18 volume % of water vapor, 1500-2000 ppm of sulfur dioxide, and about 20 g/Nm$^3$ of dusts mainly comprising particles of 20-30 microns in diameter, was passed through each of the catalyst assemblies at temperature of 350°-380° C. at a space velocity of 5000 hr$^{-1}$., or at a rate of 5600 Nm$^3$/hr., and at a linear velocity of 1.65 m/sec.

The change in the amount of the nitrogen oxides removed and the wear of the catalysts in each assembly in relation to time are shown in TABLE 1, in which the amount of the nitrogen oxides (NO$_x$) removed was calculated from the following equation:

((NO$_x$ concentration at the inlet of the reactor) — (NO$_x$ concentration at the outlet))/(NO$_x$ concentration at the inlet)×100 (%), and the wear of the catalysts is defined and was calculated from the following equation:

((the initial weight of the catalysts) — (the weight of the catalysts after the reaction for a predetermined period of time))/(the initial weight of the catalysts)×100 (%).

The catalysts after the reaction were weighed in the following manner. After the reaction for a predetermined period of time, the assembly was taken out of the reactor, and air was blown onto the catalysts to remove the dusts attached thereto. The catalysts were then calcined at temperature of 450° C. for 3 hours, cooled, and weighed.

TABLE 1

|  | Amounts of NO$_x$ removed (%) | | | | | Wear of catalyst (%) | | | | |
| --- | --- | --- | --- | --- | --- | --- | --- | --- | --- | --- |
|  | A | B | C | D | R | A | B | C | D | R |
| 500 hrs. | 89.0 | 93.5 | 88.2 | 82.1 | 93,4 | 0.09 | 0.11 | 0.17 | 0.26 | 1.27 |
| 1000 hrs. | 89.0 | 93.1 | 87.9 | 82.4 | 92.7 | 0.19 | 0.28 | 0.38 | 0.51 | 3.11 |
| 2000 hrs. | 89.1 | 93.2 | 87.7 | 82.3 | 88.9 | 0.32 | 0.52 | 0.89 | 0.98 | 7.75 |
| 3000 hrs. | 88.6 | 92.9 | 87.1 | 81.9 | 80.6 | 0.66 | 1.49 | 2.18 | 2.05 | 18.00 |

EXAMPLE 12

Forty eight catalysts of EXAMPLE 1 were fixed in baskets, which were then in turn fixed in a reactor so that the front portions thereof coated with glaze were all on the side of the inlet of the reactor in the same manner as in EXAMPLE 11, thus forming a first layer of catalysts, or the foremost layer.

A second layer of 48 catalysts of EXAMPLE 1 was fixed under the first layer of catalysts in the reactor so that the front portions thereof were also on the side of the inlet of the reactor. The thus obtained double-layered catalyst assembly will be called "E" assembly.

In the same manner as above, a first layer of 48 catalysts of EXAMPLE 1 was formed, and the a second layer of 48 catalysts of REFERENCE EXAMPLE 1 was put under the first layer. This double-layered catalyst assembly will be called "F" assembly.

A reference assembly "S", also doubly-layered, was prepared in the same manner as above using the catalysts of REFERENCE EXAMPLE 1 only.

The same waste gas as used in EXAMPLE 11 was passed through each of the above catalyst assemblies in the same manner as in EXAMPLE 11 except that the linear velocity of the gas was 3.30 m/sec.

The wear of catalysts in each assembly calculated in the same manner as in EXAMPLE 11 is shown in TABLE 2.

TABLE 2

|  | Wear of catalyst (%) | | |
| --- | --- | --- | --- |
|  | E | F | S |
| 500 hrs. | 0.14 | 0.22 | 1.88 |
| 1000 hrs. | 0.23 | 0.42 | 4.21 |
| 2000 hrs. | 0.48 | 0.95 | 10.06 |
| 3000 hrs. | 1.05 | 2.21 | 24.64 |
| 4000 hrs. | 2.92 | 5.20 | — |

What is claimed is:

1. In a method for the catalytic reduction of nitrogen oxides contained in waste gases together with dusts therein in the presence of ammonia as a reducing agent so as to convert said nitrogen oxides to nitrogen and water by use of a monolithic ceramic honeycomb catalyst having at least one passage therethrough parallel to the direction of flow of gas for allowing the gas to pass therethrough and comprising a support of at least one member selected from the group consisting of alumina and titanium dioxide and a catalytically active ingredient uniformly dispersed in the support, the ingredient being of at least one oxide of a base metal selected from the group consisting of Cu, Ni, Co, V and W, the improvement in which the support and the active ingredient are not sintered but calcined throughout the structure so as to be substantially porous throughout the structure but wherein the honeycomb catalyst is sintered only at its front inlet so as to render it substantially non-porous, thereby making the honeycomb catalyst more wear-resistant as a whole.

2. The improvement as claimed in claim 1 wherein the catalyst having the sintered front inlet is further coated with the active ingredient.

3. The improvement as claimed in claim 1 wherein the sintering is carried out in the presence of a sintering promotor.

4. In a method for the catalytic reduction of nitrogen oxides contained in waste gases together with dusts therein in the presence of ammonia as a reducing agent so as to convert said nitrogen oxides to nitrogen and water by use of a monolithic ceramic honeycomb catalyst having at least one passage therethrough, parallel to the direction of flow of gas for allowing the gas to pass therethrough and comprising a support of a least one member selected from the group consisting of alumina and titanium dioxide and a catalytically active ingredient uniformly dispersed in the support, the ingredient being of at least one oxide of a base metal selected from the group consisting of Cu, Ni, Co, V and W, the improvement in which the support and the active ingredient are not sintered but calcined throughout so as to be substantially porous throughout the structure, but wherein the honeycomb catalyst has a vitreous coating at its front inlet only so as to be non-porous at said front inlet and the honeycomb catalyst more wear-resistant as a whole.

5. The improvement as claimed in claim 4 wherein the vitreous coating is a glaze coating.

6. The improvement as claimed in claim 5 wherein the glaze is selected from the group consisting of low melting glaze and low temperature glaze.

7. The improvement as claimed in claim 4 wherein the vitreous coating is formed by heating an inorganic binder coating.

8. The improvement as claimed in claim 7 wherein the inorganic binder is a lithium silicate solution binder.

9. In a method for the catalytic reduction of nitrogen oxides contained in waste gases together with dust therein in the presence of ammonia as a reducing agent so as to convert said nitrogen oxides to nitrogen and water by use of a catalyst assembly comprising a plurality of monolithic ceramic honeycomb catalysts disposed coaxially one on the other in the reactor, each individual honeycomb catalyst having at least one passage therethrough parallel to the direction of the flow of the gas, the improvement in which at least the foremost honeycomb catalyst on the side of the inlet of the reactor is calcined throughout so as to have a porous structure, but wherein the front inlet of said foremost honeycomb catalyst(s) is sintered to render it non-porous and more wear-resistant as a whole.

10. In a method for the catalytic reduction of nitrogen oxides contained in waste gases together with dust therein in the presence of ammonia as a reducing agent so as to convert said nitrogen oxides to nitrogen and water by use of a catalyst assembly comprising a plurality of monolithic ceramic honeycomb catalysts disposed coaxially one on the other in the reactor, each individual honeycomb catalyst having at least one passage therethrough parallel to the direction of the flow of the gas, the improvement in which at least the foremost honeycomb catalyst on the side of the inlet of the reactor is calcined throughout so as to have a porous structure, but wherein the front inlet portion of said foremost honeycomb catalyst(s) has a vitreous coating to render it non-porous and more wear-resistant as a whole.

11. The improvement according to claims 1, 4, 9 or 10 wherein the non-porous calcined monolithic ceramic honeycomb catalyst(s) has a pore volume of about 0.2-0.6 cc/g.

12. The improvement according to claims 1, 4, 9 or 10 wherein the non-porous calcined monolithic ceramic honeycomb catalyst(s) has a pore volume of about 0.3-0.5 cc/g.

* * * * *